United States Patent [19]

Weber et al.

[11] Patent Number: 4,807,281
[45] Date of Patent: Feb. 21, 1989

[54] METHOD FOR LOAD DISTRIBUTION AMONG THE CENTRAL PROCESSORS OF A MULTIPROCESSOR CENTRAL CONTROL UNIT OF A SWITCHING SYSTEM

[75] Inventors: Anton Weber; Mark Clark, both of Munich, Fed. Rep. of Germany

[73] Assignee: Siemens Aktiengesellschaft, Berlin and Munich, Fed. Rep. of Germany

[21] Appl. No.: 137,345

[22] Filed: Dec. 23, 1987

[30] Foreign Application Priority Data

Jan. 12, 1987 [DE] Fed. Rep. of Germany ....... 3700673

[51] Int. Cl.$^4$ ............................................. H04M 3/00
[52] U.S. Cl. ..................................... 379/269; 379/242
[58] Field of Search ............... 379/269, 242, 224, 258, 379/309, 243

[56] References Cited

U.S. PATENT DOCUMENTS 4,720,854 1/1988 Sand .................................... 379/269
4,731,817 3/1988 Jonsson et al. .................. 379/269 X Primary Examiner—James L. Dwyer
Attorney, Agent, or Firm—Hill, Van Santen, Steadman & Simpson

[57] ABSTRACT

A method of distributing the processing load among components of a multiprocessor system, such as a switching system, avoids having two different processors (CP9) simultaneously handling different jobs for the same connection. A plurality of central processors (BP,CP,IOC) and a central main memory (CMY) are connected in parallel to a central bus system (B:CMY). As soon as they are free, each processor fetches a job for handling a switching task from a job registering means (AR), and then fetches data about the appertaining connections from the main memory (CMY). Each processor stores a protective code corresponding to its address at a location associated with the job as soon as and as long as it is handling the job. However, it does not store its code in case a different processor (CP9) has already entered its protective code there. Every central processor has its own job memory (AS). When a processor finds the protective code of another processor associated with the job data, it forwards its own job to this other processor by entering this job into the job memory (AS) of the other processor.

3 Claims, 2 Drawing Sheets

METHOD FOR LOAD DISTRIBUTION AMONG THE CENTRAL PROCESSORS OF A MULTIPROCESSOR CENTRAL CONTROL UNIT OF A SWITCHING SYSTEM

BACKGROUND OF THE INVENTION

The invention relates to distribution of a processing load among the processors of a multiprocessor system, and particularly to a multiprocessor system in a telephone network.

In the past, earlier German patent applications Nos. P 36 29 406.3 and P 36 29 466.7 disclose methods by means of which central processors fetch new jobs either stored in a central job registering means or stored elsewhere and fetched by means of a central job registering means. Such new jobs usually correspond to status signals of subscriber connections, or of switching system elements which are allocated to a specific connection which is to be either set up, maintained, or cleared down, and which requires processing by one of the central processors.

SUMMARY OF THE INVENTION

The principal objects of the invention are to avoid having two different central processors simultaneously process two or more different jobs for one and the same connection, even though the processing of the one of these jobs may depend on the result of the processing of the other of these jobs, and to avoid having the first processor not identify or belatedly identify the existance of the second status signal, as well as to avoid having the central processor have the second job wait until it can forward this job to the other central processor, viz., until this other central processor has completely handled its previous job. These objects are achieved by the present invention.

SUMMARY OF THE DRAWINGS

The invention shall be set forth in greater detail with reference to the exemplary embodiment shown in the two figures. Thereby shown are.

DESCRIPTION OF THE PREFERRED EMBODIMENT

Figure 1:
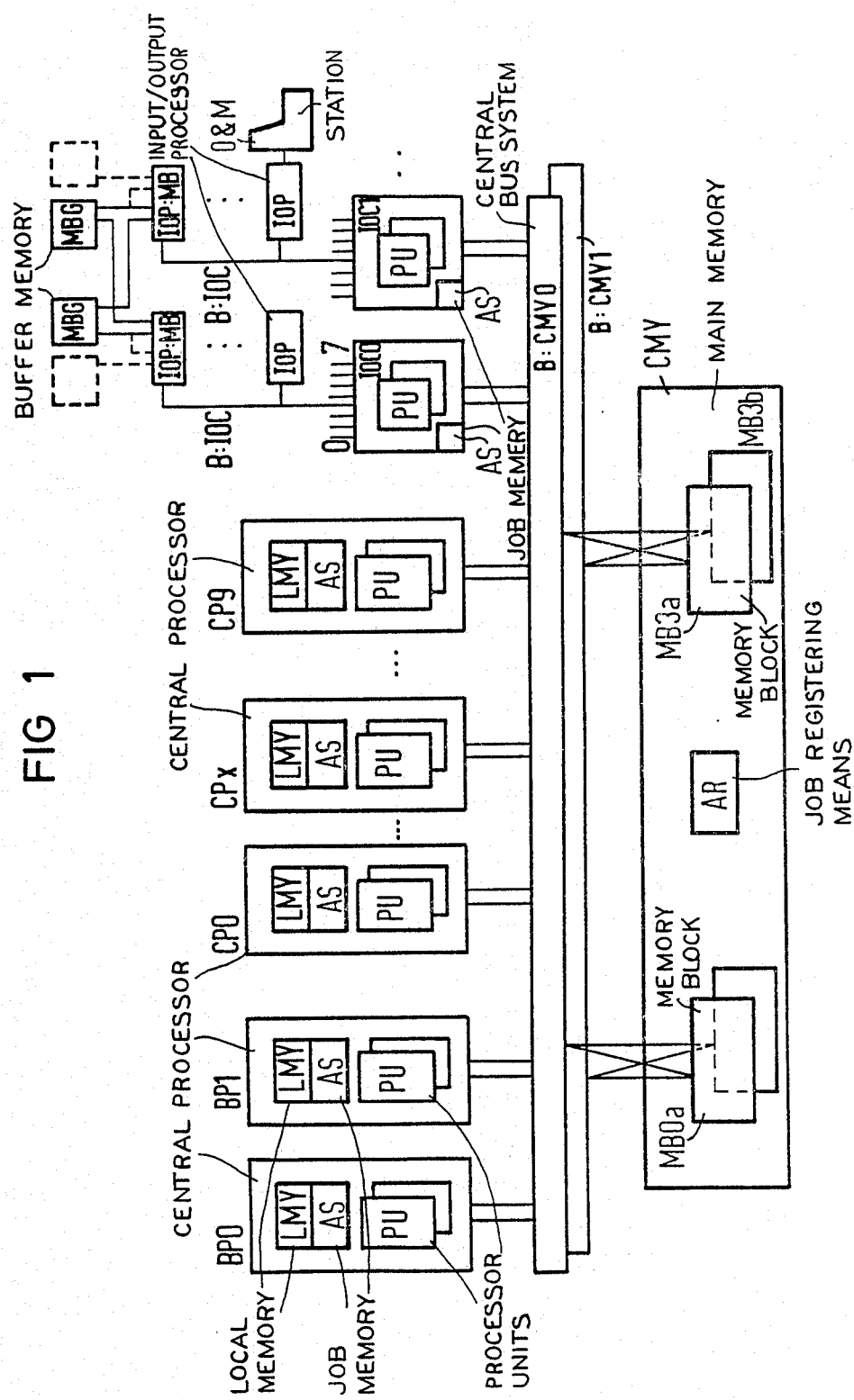
FIG. 1 an example of the major component parts of a switching system comprising, a multiprocessor central control unit constructed in accordance with this invention.

The example shown in FIG. 1 largely corresponds to the examples discussed in the afore-mentioned, German patent application, particularly the example discussed in German patent application No. P 36 29 399.7 as well as in U.S. patent application Ser. No. 651,954, filed Sept. 19, 1984. The content of these patent applications is hereby incorporated by reference hereinto, so that it is not necessary to describe in detail the already known features of the example shown in the present FIG. 1. It is adequate to emphasize the special, new measures of the present invention.

FIG. 1 thus shows central processors BP, CP, IOC, which are connected in parallel to a central bus system B:CMY. Further, a central, main memory CMY which contains a plurality of memory blocks is connected to the central bus system B:CMY.

As soon as a central processor is free and functional it automatically fetches a new job for processing, viz., a switching job which is stored in a central job registering means AR. This job registering means AR can be formed by a special section in the main memory CMY. Such a job may relate to a detail in the course of "calling" or "through connecting".

The central main memory CMY stores the most important data about the current connections in the switching system. The various central processors each have access to such data via the central bus system B:CMY.

As a rule, the jobs stored in the job registering means AR represent status signals from subscribers and/or from exchange system elements. For example, these jobs thus derive from subscribers who are connected to the periphery status buffer memory MBG. The switching system elements which deposit their own status signals/jobs in the job registering means AR can fundamentally involve arbitrary elements of this type i.e., for example, input/output processors IOP, and buffer memories such as MBG or connected terminal equipment such as the O&M station O&M, or can also, for example, involve status signals which derive from the central processors BP, CP, IOC or from the bus system B:CMY or from component parts of the main memory CMY itself.

As soon as one of the central processors, for example CPx, has fetched a job in the job registering means AR, it reads the data belonging to the appertaining connection from the central main memory CMY. These connections are respective connections which are to be setup, be maintained or be cleared down. The same central processor, CPx in this case, also attaches a protective code to these data of the connection at a single, appropriate, characteristic location, whereby this protective code respectively corresponds to the address of this central processor CPx. This central processor CPx thus determines that the data of a connection stored in the main memory CMY has a protective code corresponding to the address of this central processor CPx attached to such data at least at a single, characteristic location, as soon as, and as long as this central processor CPx is processing a fetched job associated with this connection. As soon as the associated central processor CPx has ended this processing, it in turn cancels the protective code it entered.

During subsequent reading, generally even before reading, each of the central processors BP, CP, IOC which fetches a new job in the job registering means AR checks the data of the connection stored in the main memory CMY immediately to see whether a protective code allocated to another central processor is already stored for the appertaining connection. In case the protective code encountered during this check is allocated to another central processor, this checking processor does not process the new job it has fetched and no longer reads or no longer completely reads—the data about the appertaining connection out of the main memory CMY.

Every central processor BP, CP, IOC respectively has its own job memory AS individually allocated to it. These can be discrete memories applied in the appertaining, central processor or, for example, can also be formed by memory areas in the main memory CMY individually allocated to the respective processor. New jobs which relate to the same connection which the appertaining central processor is processing at the moment can be written into this job memory AS, as well as further information.

When a processor, in checking a protective code (here referred to as second processor, for example CP9), identifies that this protective code which has been allocated to another central processor, for example CPx, the checking processor CP9 immediately enters its new job most recently fetched from the job registering means AR into the job memory AS of the appertaining, other central processor CPx, so that this latter central processor CPx can itself generally process this further, new job entered by the processor CP9 immediately after the conclusion of the job previously handled by it. Since the central processor CP9 was capable of immediately forwarding its job to the processor CPx, it can itself immediately thereafter fetch a new, further job in the job registering means AR or, respectively, can call in such a further job from its own job memory AS.

Figure 2:
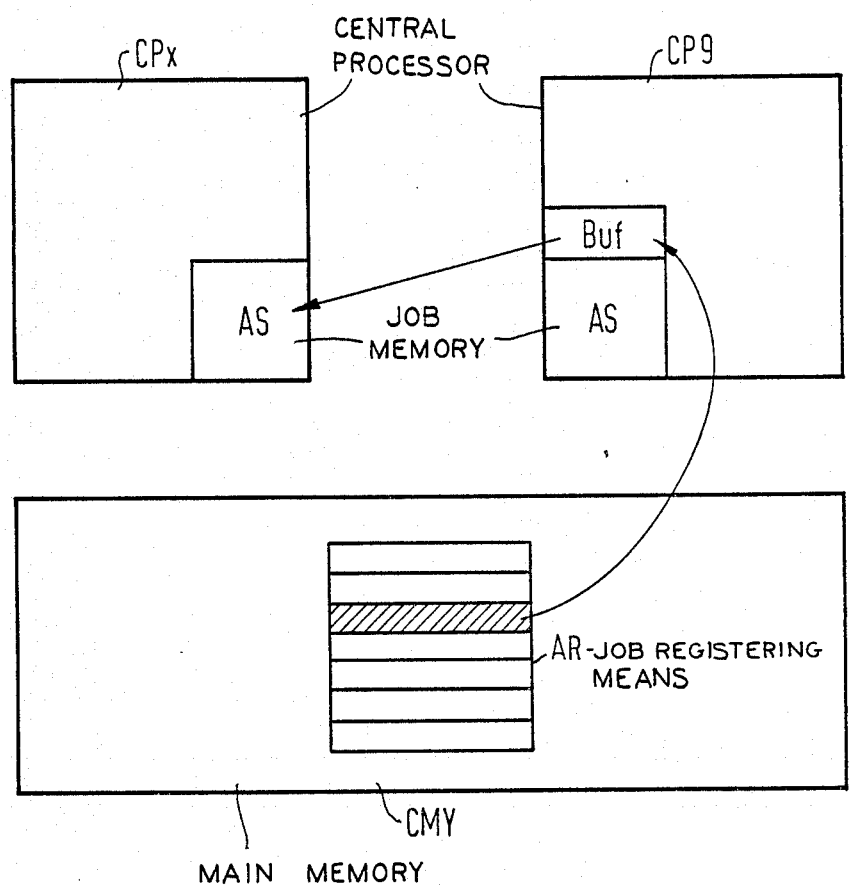
FIG. 2 illustrates data flows between the central, main memory and two central processors, shown schematically.

A second central processor, for example CP9, currently checking a protective code can immediately write its own, new second job most recently fetched from the job registering means AR into the job memory AS of the first central processor CPx when it has identified that this protective code is allocated to another first central processor, for example CPx, so that this first central processor CPx (usually immediately after the conclusion of its previous, first job) can in turn itself process this new, second job, and so that the second central processor CP9 can now immediately fetch another, new, third job in the job registering means AR, or, respectively, the processor CP9 can call in another, new, third job from its own job memory AS. As indicated in the diagram shown in FIG. 2, the job which proceeds from the job registering means AR to the second processor CP9 was forwarded to the job memory AS of the first processor CPx.

The present invention thus avoids having the two different central processors CPx, CP9 simultaneously handling two different jobs for one and the same connection, even though the handling of the one of these jobs may have been dependent on the result of the handling of the other of these jobs. Further, the invention has also avoided the possibility of having the processor CPx handling the one job not identifying or belatedly identifying the existance of the other job. Further, the invention has also avoided having the second processor CP9 processing the second job having to wait until it could pass this job on to the other. first processor CPx, namely having to wait until this other, first processor CPx has completely handled the job it was previously processing.

The remaining processors work in the same way as soon as they fetch jobs. In such a switching system, a call setup or, respectively, call clear down is carried out in chronologically successive processing steps. These processing steps are initiated in the central control unit by status reports which usually come from the exchange-oriented periphery, whereby these status signals respectively represent jobs, as a rule. These status signals/jobs are thus entered into a job registering means AR shared by all central processors and are then individually taken from there by the individual processors and handled.

The invention thus successfully prevents a plurality of central processors from simultaneously handling jobs which belong to one and the same connection. This, however, does not mean that the overall call setup is always allocated to only one processor; the allocation of a processor to a call usually exists only during the respective duration of the handling of a single job. The next job for the same connection can thus be handled by an arbitrary, other central processor.

The chronologically parallel handling of jobs which belong to different connections is possible without further complications in such a multiprocessor system, because all processors can respectively simultaneously execute jobs of another connection independently of one another.

The principle of this invention, that a specific connection is handled by only a single central processor at one time, simplifies the problem of access to the shared data that are stored in the main memory CMY. All data, meaning a group of data that are currently allocated to a connection, are thus protected in toto against the access by other processors during the handling by one of the processors, These data are protected against modifications which such another processor would trigger.

A further achievement of the load distribution of the invention is thus to avoid waiting times in the multiprocessor system. In case a central processor takes a job from the job registering means AR, such job belonging to a connection which is already being handled by another central processor, this should not effect any other waiting times or other system blockages in so far as possible. Only that single central processor, as soon as it was the first to fetch a job for a connection, reads that central data structure (or that plurality of data structures) from the main memory CMY which is unambiguously allocated to this appertaining connection. The processing processor immediately enters its protective code into this central data structure or structures, such as, for example, its own processor number or its own process incarnation number. As soon as the protective code has been entered, no other processor will begin handling a job for the same connection. In particular, thus, all remaining connection data for this connection are also protected against multiple access, i.e. they are exclusively available to the one processor for the duration of its job handling At the end of the job handling, the protective code is immediately erased from the central data structure in turn, so that time losses, especially corresponding formations of waiting lists, are avoided, these potentially arising when a different central processor fetches a job for this connection at a later time and subsequently forwards this job to that processor that had initially handled a job for this connection as the first processor.

When, during the job handling for a specific connection by the one central processor, for example CPx, another central processor, for example CP9, fetches a job for the same connection from the job registering means AR, the invention proceeds in the following way: the processor CP9 first starts the reading of the appertaining, central data structure for the connection from the main memory and checks whether a protective code of another processor has already been entered. If such has been entered, it refrains from further read-out and from further handling of this job, and instead surrenders this job to the entered, central processor, for example to CPx, for further handling. Subsequently, the central processor CP9 is again free for other jobs. It then fetches the next job from the job registering means AR or takes its place in a waiting line of those central processors currently prepared to fetch. Waiting times or, respectively, other lost system times are avoided on the basis of this principle and, after the conclusion of the job then being executed, the processor CPx can, as the next processor, immediately begin with the handling of that job that was transferred to it by the processor CP9.

The invention thus utilizes the possiblity of recognizing that a connection is already being processed by another processor, whereby the active processing processor can be unambiguously identified from the protective code.

In the example illustrated in FIG. 1, every central processor BP, CP, IOC has a display unit, for example an appropriate register, allocated to it, this indicating whether the appertaining central processor, for example CPx, is presently operable or malfunctioning. An arbitrary central processor referred to as a second central processor, for example CP9, first checks the display of the display unit of another central processor referred to as first central processor, CPx, before this second central processor CP9 writes its new job, referred to as second job out of its job register Buf into the job memory AS of the first central processor CPx. Only when the appertaining display unit indicates the operability of the first central processor CPx does the second central processor CP9 write the new, second job from its job register Buf into the job memory AS of the first central processor CPx. What is achieved in this way is that faultily functioning, non-operable processors do not accept any job that they can not properly handle, and that connections which have become hung up can be recognized, as well as dead connection resources. Even when a central processor has been taken out of operation because of a hardware fault, its display unit can indicate the inoperability to every other central processor.

When the display unit of the first central processor CPx indicates the malfuncting thereof, the second central processor CP9 can now handle this job itself instead of transferring its new job to the malfunctioning processor CPx, whereby it immediately overwrites the protective code, hitherto attached to the appertaining connection, with its own protective code. On the basis of the protective code which has newly been entered, every arbitrary, other central processor can then (when it reads the data belonging to the appertaining connection) recognize which central processor is actually currently handling a job for the appertaining connection.

The data stored in the main memory for a connection can be interrogated in various ways by an accessing, central processor. For example, the data can be structured such, or else the appertaining memory area can be constructed and controlled such, that the appertaining central processor merely cites the number of a time-multiplex channel which is allocated to the connection in one of the system elements, in order to be able to locate all other data. However, the data can also be structured such, or the appertaining memory area can be constructed and controlled such, that the appertaining processor can also access the data of a connection on the basis of different search words, for example on the basis of an address of a subscriber encountered in the job and/or on the basis of an address of a specific system element/system component. For example, data relating to connections which are currently being set up or maintained or are being cleared down from a specific, external memory or element can also be called in this way.

Since access of the data of one and the same connection is also possible when the appertaining job only contains a more or less arbitrary, individual details about the connection, a first central processor, for example CPx, can call in the data of a connection in this development of the invention because its job contains a reference to the specific address of a time channel in a specific system element, so that the appertaining, first processor CPx can accordingly attach its protective code to the data of the appertaining connection. On the basis of a job which contains another detail of the connection as a reference, for example another time channel in another system element of the switching system, a second central processor can likewise basically access the overall data of this connection, whereby it will discover the protective code of the first central processor CPx, so that it can transfer its job to the first central processor by writing into its job memory AS. The invention thus offers great ease when transferring the job from one central processor to another central processor.

It will be apparent that various modifications and/or additions may be made in the apparatus of the invention without departing from the essential feature of novelty involved, which are intended to be defined and secured by the appended claims.

We claim:

1. A method for distributing processing load among the central processors (BP, CP, IOC) of a multiprocessor central control unit of a switching system, having a plurality of central processors (BP, CP, IOC) which, in case they are free and operable, respectively automatically fetch a job for processing a switching task, such as a job relating to a detail of "calling" or "through connecting", stored at a central job registering means (AR), fetching it from said central job registering means; and having a central main memory (CMY) which stores data about the current connections in various memory areas and to which the central processors (BP, CP, IOC) have access via a central bus system (B:CMY), said processors being connected in parallel to said central bus system (B:CMY), including the steps of;

storing in said control processor a protective code corresponding to the address of this central processor (CPx), attaching such protective code to the data of each and every connection to be set up or be maintained or be cleared down, such code being attached thereto in at least a single, characteristic location as soon as and as long as this central processor (CPx) is handling a fetched job appertaining to this connection, immediately erasing the protective code for the appertaining connection it has entered as soon as the central processor (CPx) has handled its job, whereby each (for example CP9) of the central processors (BP, CP, IOC) which fetches a new job in the job registering means (AR) immediately checks the data stored in the main memory (CMY) which relate to the connection belonging to its (CP9) job, checking these upon subsequent reading to see whether a protective code for the appertaining connection allocated to another central processor (for example CPx) is already stored, and whereby the central processor (CP9) checking the protective code does not handle its (CP9) fetched new job when the protective code is allocated to another central processor (CP9) and does not completely read the appertaining data, characterized in that every central processor (BP, CP, IOC) has its own job memory (AS) individually allocated to it, with those further, new jobs which relate to the same connection which the central processor allocated to the job memory (AS) is currently handling being written thereinto;

when a second central processor (CP9), in checking a protective code, identifies that this protective code is allocated to another, first central processor (CPx), the said second central processor (CP9) immediately writes its own, new, second job most recently fetched from the job registering means (AR) into the job memory (AS) of the first central processor (CPx), so that this first central processor (CPx) can itself in turn handle this new, second job, after the conclusion of its (CPx) previous, first job; whereby the second central processor (CP9) can immediately fetch another, new, third job in the job registering means (AR) or, respectively, can fetch another, new, third job from its (CP9) own job memory (AS).

2. The method according patent claim 1, wherein every central processor (BP, CP, IOC) has a display unit allocated to it, for indicating whether the appertaining central processor is currently operable or malfunctioning; and including the step of, before writing the new, second job into the job memory (AS) of the first central processor (CPx), the second central processor (CP9) first checks the display of the display unit of the first central processor (CPx) and only writes the new, second job into the job memory (AS) of the first central processor (CPx) when the appertaining display unit indicates the operability of the first central processor (CPx).

3. The method according to claim 2, including the step of, when the display unit of the first central processor (CPx) indicates the malfunctioning thereof, the second central processor (CP9) overwrites the checked protective code with its (CP9) own protective code and handles the new, second job itself (CP9).

* * * * *